US007211793B2

(12) United States Patent
Currier et al.

(10) Patent No.: US 7,211,793 B2
(45) Date of Patent: May 1, 2007

(54) MASS SPECTROMETRY SYSTEM AND METHOD

(75) Inventors: Neal W. Currier, Columbus, IN (US); Aleksey Yezerets, Columbus, IN (US)

(73) Assignee: Cummins, Inc, Columbus, IN (US)

( * ) Notice: Subject to any disclaimer, the term of this patent is extended or adjusted under 35 U.S.C. 154(b) by 0 days.

(21) Appl. No.: 10/983,884

(22) Filed: Nov. 9, 2004

(65) Prior Publication Data

US 2006/0097152 A1 May 11, 2006

(51) Int. Cl.
*H01J 49/04* (2006.01)
*B01D 59/44* (2006.01)

(52) U.S. Cl. ....................... 250/288; 250/281; 250/282

(58) Field of Classification Search ..................... None
See application file for complete search history.

(56) References Cited

U.S. PATENT DOCUMENTS

| | | | | | |
|---|---|---|---|---|---|
| 3,533,753 | A | * | 10/1970 | Berger | 502/324 |
| 4,626,412 | A | | 12/1986 | Ebner et al. | |
| 4,717,675 | A | * | 1/1988 | Sievers et al. | 436/103 |
| 4,916,313 | A | * | 4/1990 | Hall et al. | 250/282 |
| 5,281,397 | A | | 1/1994 | Ligon et al. | |
| 5,314,827 | A | * | 5/1994 | Schmidt et al. | 436/106 |
| 5,318,752 | A | | 6/1994 | Visser | |
| 5,565,171 | A | | 10/1996 | Dovichi et al. | |
| 5,783,741 | A | | 7/1998 | Ellis et al. | |
| 6,426,226 | B1 | | 7/2002 | Senkan | |
| 6,875,725 | B2 | * | 4/2005 | Lindner et al. | 502/328 |
| 2002/0121596 | A1 | | 9/2002 | Laiko et al. | |
| 2004/0139858 | A1 | * | 7/2004 | Entezarian et al. | 95/275 |

FOREIGN PATENT DOCUMENTS

| | | | |
|---|---|---|---|
| DE | 921393 | * | 6/1999 |
| EP | 0921393 | * | 6/1999 |
| JP | 60-231161 | | 11/1985 |
| JP | 8-327622 | | 12/1996 |
| JP | 2001-91438 | | 4/2001 |
| WO | WO 98/15969 | | 4/1998 |
| WO | WO 00/77821 | | 12/2000 |
| WO | WO 02/16927 | | 2/2002 |
| WO | WO 02/092220 | | 11/2002 |

OTHER PUBLICATIONS

The Mass Spectrometer-how it works "The Mass Spectrometer" http://www.chemguide.co.uk/analysis/masspec/howitworks.html pp. 1-8, (Jun. 2, 2004).

* cited by examiner

*Primary Examiner*—Nikita Wells
(74) *Attorney, Agent, or Firm*—Nixon Peabody LLP; Tim L. Brackett, Jr.; J. Bruce Schelkopf

(57) ABSTRACT

Mass spectrometry system for analyzing components of a gas. In accordance with one embodiment, the system includes a mass spectrometer adapted to analyze components of the gas, and an inlet capillary fluidically connected to the mass spectrometer to convey a sample of the gas to the mass spectrometer. The inlet capillary includes an inner bore with a bore wall having a catalytic coating thereon for reacting with at least one component of the sampled gas to convert the at least one component to another gas species as the sampled gas is conveyed through the inlet capillary. The mass spectrometer is adapted to analyze the converted gas species and derive information, such as quantity, of the component of sample gas that has been converted. A method of analyzing a gas is also provided.

19 Claims, 3 Drawing Sheets

MASS SPECTROMETRY SYSTEM AND METHOD

BACKGROUND OF THE INVENTION

1. Field of the Invention

The present invention is directed to an inlet system for a mass spectrometer that facilitates analysis, and a method for analyzing a gas by mass spectrometry.

2. Description of Related Art

Mass spectrometry systems and mass spectrometry methods for analysis are both known in the art, and are utilized to analyze chemical compounds including gases made up of various components. In particular, mass spectrometric analysis techniques allow the components of the gas being analyzed to be identified and measured. Mass spectrometry systems and techniques offer various advantages that are not provided by many other analytical equipment and techniques. These advantages include a very fast response time, and the ability to analyze variety of gas components using the same equipment. Moreover, mass spectrometry systems are relatively economical, thereby allowing analysis of chemical compounds such as gases, in a cost effective manner.

For example, U.S. Pat. No. 4,646,412 to Ebner et al. discloses an apparatus and a method for carrying out catalysis and catalyzed chemical reactions. In particular, the reference discloses a reactor with a catalyst zone, under vacuum, into which a very rapid pulse of reactant gas is pulsed. The products are analyzed by mass spectrometry. The reference further discloses that the apparatus and method can detect reaction intermediates and products, and can indicate their sequence of production.

U.S. Pat. No. 5,565,171 to Dovichi et al. discloses a reactor for reacting, and analyzing, a sample organic molecule. The reference discloses that the reactor includes a continuous capillary connected between two valves that control fluid flow in the capillary. One part of the capillary is disclosed as forming a reaction chamber where the sample may be immobilized to allow subsequent reaction with reagents that are supplied through the valves. Another part of the capillary is disclosed as passing through, or terminating in, a detector portion of a mass spectrometer.

In view of the above noted advantages, mass spectrometry systems and methods have been implemented to analyze, and to measure, gas composition in exhaust gases of internal combustion engines. In particular, mass spectrometry systems and methods have been used to analyze and measure gas components in exhaust gas recirculation (EGR) manifolds, as well as in exhaust after-treatment devices such as NOx adsorbers.

However, some components of the exhaust gas that are generated by an internal combustion engine may be difficult to measure, even when mass spectrometry equipment and methods of analysis are used. Some components of exhaust gas such as various hydrocarbons cannot be analyzed or measured accurately using mass spectrometry equipment and methods of analysis.

Therefore, in view of the above, there exists an unfulfilled need for a mass spectrometry system for analyzing components of a gas that overcomes the limitations of conventional mass spectrometry systems. There also exists an unfulfilled need for a method of analyzing a gas by mass spectrometry that overcomes the limitations of conventional mass spectrometry techniques, and further allows the above noted analysis and measurements to be attained.

SUMMARY OF THE INVENTION

The above noted difficulty in measuring some components of the exhaust gas is largely due to ions or fragments of certain exhaust gas components interfering with ions or fragments of other components of the exhaust gas. For example, conventional low-mass-resolution mass spectrometry equipment and methods of analysis cannot readily measure carbon monoxide (CO) in the presence of nitrogen (N). This is due to the fact that both CO and N appear at a mass-to-charge ratio (m/e) of 28 atomic mass unit (AMU) in mass spectrometric method of analysis. In addition, various hydrocarbons possess very similar fragmentation products which prevent accurate attribution of the mass spectrometry signal at a given mass-to-charge ratio.

In view of the foregoing, one aspect of the present invention is a mass spectrometry system for analyzing components of a gas that overcomes the limitations of conventional mass spectrometry systems.

An advantage of the present invention is in providing a mass spectrometry system that allows the analysis and measurement of gas components which are subject to isobaric interference from other components of the gas.

Still another advantage of the present invention is in providing a mass spectrometry system that allows the analysis and measurement of various gas components that possess similar fragmentation patterns.

Another aspect of the present invention is in providing a method of analyzing a gas by mass spectrometry that overcomes the limitations of conventional mass spectrometry techniques.

These and other advantages and features of the present invention are provided by a mass spectrometry system for analyzing components of a gas including a mass spectrometer adapted to analyze components of the gas, and an inlet capillary fluidically connected to the mass spectrometer to convey a sample of the gas to the mass spectrometer. The inlet capillary includes an inner bore with a bore wall having a catalytic coating thereon for reacting with at least one component of the sampled gas to convert the component to another gas species as the gas is conveyed through the inlet capillary. The mass spectrometer is adapted to analyze the converted gas species to derive information associated with the component of gas.

In accordance with one application of the present invention, the gas analyzed is an exhaust gas from an internal combustion engine that includes carbon monoxide and nitrogen gas components. In one embodiment, the catalytic coating includes palladium and/or platinum, and converts the carbon monoxide component of the gas into carbon dioxide. The catalytic coating may be applied to the bore wall in any appropriate manner, for example, by chemical vapor deposition or deposition-precipitation. In accordance with another embodiment, the mass spectrometry system further includes a heater adapted to heat the catalytic coating. In this regard, the heater may be positioned on an outer wall of the inlet capillary. The heater may be implemented as an electrical heater that circumscribes the outer wall of the inlet capillary, the temperature of the heater being adjustable.

In still another implementation of the present invention, the mass spectrometry system further includes a secondary capillary fluidically connected to the inlet capillary for providing a secondary gas to the sampled gas. In this regard, a mixing device may be provided upstream of the catalyzed region that mixes the secondary gas provided through the secondary capillary with the sampled gas in the inlet capillary.

In accordance with another aspect of the present invention, a method of analyzing a gas by mass spectrometry is provided, the method including providing a mass spectrometer adapted to analyze a plurality of components of the gas, providing an inlet capillary with an inner bore that has a bore wall, coating the bore wall with a catalytic coating, conveying a sample of the gas to the mass spectrometer through the inner bore of the inlet capillary, and reacting at least one component of the sampled gas with the catalytic coating to convert it to another gas species as the gas is conveyed. In one embodiment, the method further includes analyzing the gas species to derive information associated with the converted gas component. The method may further include heating the catalytic coating as the gas is conveyed through the inlet capillary. In this regard, the method may also include adjusting the temperature of the catalytic coating. In accordance with another embodiment, coating of the bore wall with the catalytic coating is attained using a chemical vapor deposition process that includes heating of at least a segment of the inlet capillary, or a deposition-precipitation process. The chemical vapor deposition process may further include conveying a gaseous precursor through the inlet capillary, and decomposing the precursor.

Yet another aspect of the present invention is a method of analyzing exhaust gas from an internal combustion engine that has carbon monoxide and nitrogen gas components using mass spectrometry. In one embodiment, the method includes providing an inlet capillary with an inner bore that has a bore wall, depositing a catalytic coating having at least one of palladium and platinum on the bore wall by chemical vapor deposition process, conveying a sample of the gas through the inner bore of the inlet capillary, reacting the carbon monoxide component of the sampled gas with the catalytic coating to convert the carbon monoxide to carbon dioxide as the sampled gas is conveyed through the inlet capillary, analyzing the carbon dioxide that is converted from the carbon monoxide by mass spectrometry, and deriving information regarding the carbon monoxide based on analysis of the carbon dioxide that is converted from the carbon monoxide.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

As described in detail herein below, the present invention provides a mass spectrometry system and method for analyzing components of a gas that overcomes the limitations of conventional mass spectrometry systems and methods. In particular, the mass spectrometry system and method of the present invention allows the analysis and measurement of gas components which otherwise, may not be easily measured due to interference by other components of the gas. The mass spectrometry system and method of the present invention further allows analysis and measurement of various gas components that possess similar fragmentation patterns from one another. Example embodiments of the present invention are described in detail below as applied to analysis of exhaust gas from an internal combustion engine as the present invention can be advantageously used in such applications. However, it should be recognized that the present invention is not limited thereto, and may be used for analysis of any gas.

Figure 1:
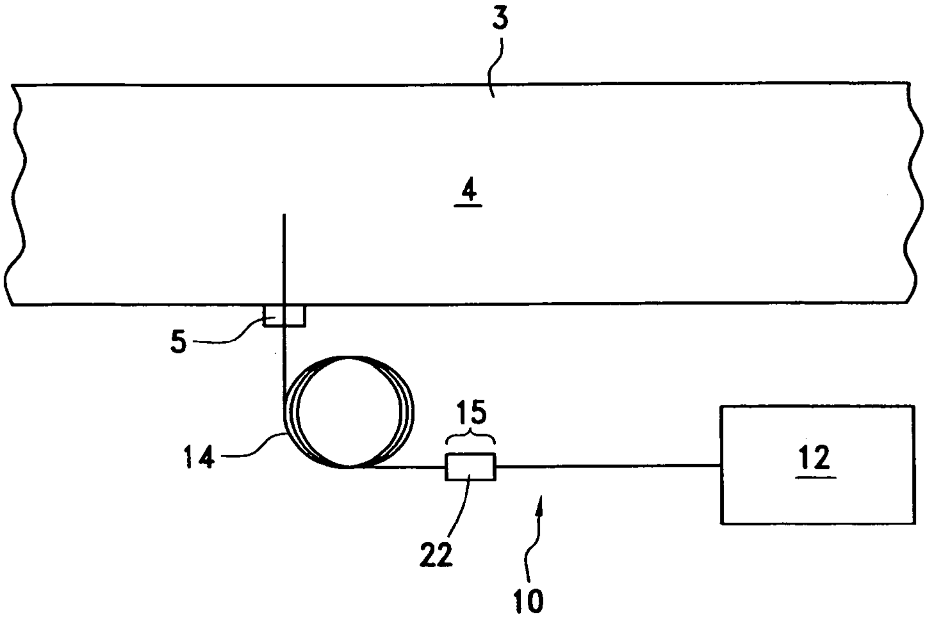
FIG. 1 is a schematic illustration of a mass spectrometry system in accordance with one embodiment of the present invention.

FIG. 1 is a schematic illustration of a mass spectrometry system 10 in accordance with one example embodiment of the present invention. The mass spectrometry system 10 includes a mass spectrometer 12, and an inlet capillary 14 that is adapted to convey a small amount of gas to be analyzed to the mass spectrometer 12. In this regard, one end of the inlet capillary 14 is connected to the mass spectrometer 12, while another end of the inlet capillary 14 is connected to a source of a gas to be analyzed, for example, exhaust gas stream 4 from an internal combustion engine (not shown). The inlet capillary 14 may be connected to a sampling port 5 of the exhaust piping 3 shown that conveys the exhaust gas stream 4 therein. The inlet capillary 14 also includes a catalyzed region 15 through which the sampled gas is passed as described in further detail below.

Figure 2:
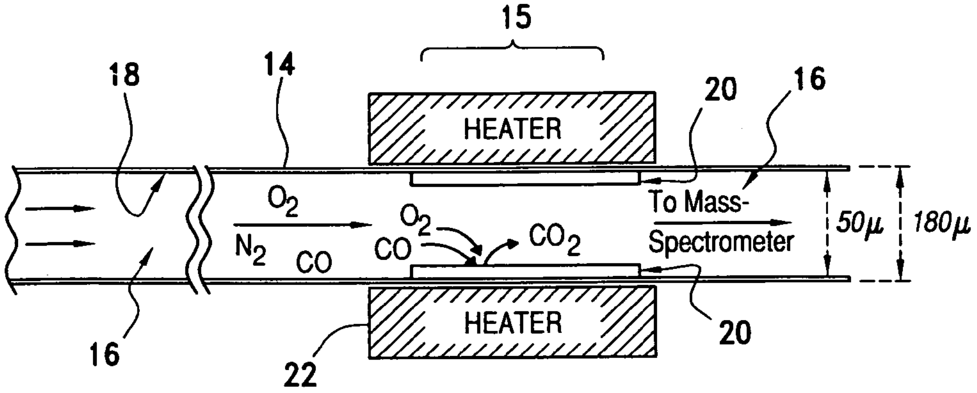
FIG. 2 is an enlarged schematic cross-sectional illustration of the inlet capillary of the mass spectrometry system shown in FIG. 1.

FIG. 2 shows an enlarged schematic, cross-sectional illustration of the catalyzed region 15 of the inlet capillary 14. As shown, the inlet capillary 14 includes an inner bore 16 with a bore wall 18. The inner bore 16 of the inlet capillary 14 is sized to allow conveyance of the sampled exhaust gas stream 4 to the mass spectrometer 12. In the illustrated embodiment, the diameter of the inner bore 16 is approximately 50 micrometers, and the total diameter of the inlet capillary 14 is approximately 180 micrometers. Thus, the bore wall 18 has a thickness of approximately 65 micrometers. The length of the inlet capillary 14 in the illustrated embodiment is approximately one meter long. Of course, it should be appreciated that the described geometry of the inlet capillary 14 is merely one example implementation, and the inlet capillary 14 may be dimensioned differently in accordance with the needs of the application of the mass spectrometry system 10.

The mass spectrometry system 10 in accordance with the illustrated embodiment is also implemented with a catalytic coating 20 on the bore wall 18 along at least a portion of the inlet capillary 14 that defines a catalyzed region 15. It should be evident that whereas in the illustrated embodiment, only a portion of the inlet capillary 14 is provided with the catalytic coating 20, the catalytic coating 20 may be provided in multiple different regions along the length of the bore wall 18, or even along the full length of the inlet capillary 14 in other embodiments. The catalytic coating 20 converts at least one component of the sampled gas into another gas species so that this converted gas species can be measured and analyzed to derive information regarding the component of gas that was converted.

In addition, the mass spectrometry system 10 of the illustrated embodiment includes a heater 22 that is positioned on the outer wall 24 of the inlet capillary 14. The heater 22 heats the catalytic coating 20 when in operation, to improve the efficacy of the catalytic coating 20 in converting the component of the sampled gas. In the present embodiment, the heater 22 circumscribes the inlet capillary 14, and is implemented in any appropriate manner, for example, as an electrical heater. In addition, the temperature of the heater 22 may be adjustable so that depending on the desired catalytic activity, the catalytic coating, and/or the sampled gas, the temperature of the heater 22 can be appropriately adjusted to attain the desired result. However, in other embodiments, the heater 22 may be implemented in a different manner, or not be provided at all if the catalytic coating 20 is effective in converting the desired component of the sampled gas into the desired gas species.

The catalytic coating 20 provided in the inlet capillary 14 of the mass spectrometry system 10 in accordance with the present invention converts at least one component of the gas to be analyzed into another gas species. This allows the mass spectrometry system 10 to measure, analyze the converted gas species, and derive information regarding the converted component of gas from the analysis. Thus, the present invention overcomes the difficulties caused by ions or fragments of different gas components interfering with measurements of each other, or difficulties associated with measuring and analyzing gas components that possess similar fragmentation patterns.

The catalytic coating 20 in accordance with one embodiment may include palladium (Pd) that oxidizes various gas components with $O_2$, for example, oxidizes CO to convert it into $CO_2$. In such an embodiment, the inlet capillary 14 converts CO to $CO_2$ prior to the gas sample being conveyed to the mass spectrometer 12. The mass spectrometer 12 derives information regarding the CO component by measuring and analyzing $CO_2$ that was converted from CO. Unlike CO, $CO_2$ appears at a mass-to-charge ratio (m/e) that is different than nitrogen (N) so that the mass spectrometer 12 can accurately measure and analyze information regarding $CO_2$ to derive information regarding CO. In this manner, the mass spectrometry system 10 can readily measure and analyze CO even in the presence of nitrogen (N), by measuring and analyzing the $CO_2$.

Baseline $CO_2$ amounts in the exhaust gas stream 4 can be measured so that the amount of $CO_2$ that has been converted from CO can be accurately determined. In particular, in order to obtain accurate measurement of the amount of $CO_2$ that has been converted from CO, the initial amount of $CO_2$ in the exhaust gas stream 4 should be measured, and subtracted from the amount of $CO_2$ measured in the inlet capillary 14 by the mass spectrometer 12 (after CO is converted to $CO_2$). The determined amount of $CO_2$ can then be used to derive information such as the amount of CO.

Referring again to FIG. 2, one method of providing the catalytic coating 20 on the bore wall 18 of the inlet capillary 14 is described in detail herein. The catalyzed inlet capillary 14 may be prepared using a chemical vapor deposition process (CVD). In particular, in accordance with one method, palladium acetylacetonate which is a catalytic precursor, is contained in a gas chromatograph sample vial that is equipped with a septum. The inlet capillary 14 is inserted into the vial through the septum. The vial is placed into a gas chromatograph oven, and the inlet capillary 14 is fed out of the oven, and into the heater 22 which heats a portion of the inlet capillary 14, for example, about 25 centimeter portion of the inlet capillary 14. The remaining end of the capillary is attached to the inlet of a mass spectrometer 12 such as those available from Agilent Technologies (www.agilent-.com). The gas chromatograph oven is heated to approximately 110° C. to volatilize the catalytic precursor which is then, conveyed through the inlet capillary 14, for example, by applying a vacuum at the end of the inlet capillary 14 that is connected to the mass spectrometer 12.

As the catalytic precursor is conveyed through the inlet capillary 14, the heater 22 positioned on a segment of the inlet capillary 14, is heated to approximately 200° C.. Due to the heat, the catalytic precursor decomposes to yield palladium that deposits on the surrounding bore wall 18 to form the catalytic coating 20. The gas conveyed to the mass spectrometer 12 may be analyzed using the mass spectrometer 12 to provide confirmation of the desired decomposition of the catalytic precursor. In this regard, the mass spectrometer data obtained during preparation of the inlet capillary 14 in accordance with the described method indicated fragments typical of acetylacetone which is consistent with decomposition of the palladium acetylacetonate. This indicates that palladium was deposited on the bore wall 18 of the inlet capillary 14. Of course, other appropriate methods for providing a catalytic coating 20 may be utilized, and the described method is provided merely as one example.

Performance of the inlet capillary 14 that was manufactured in the above described manner was tested by inserting an end of the inlet capillary 14 into a manifold of a micro-reaction system, and flowing various gas mixtures including CO and $C_3H_6$, therethrough. During this testing, the catalyzed portion of the capillary was heated using heater 22, to enhance the oxidation process of CO and $C_3H_6$.

Figure 3:
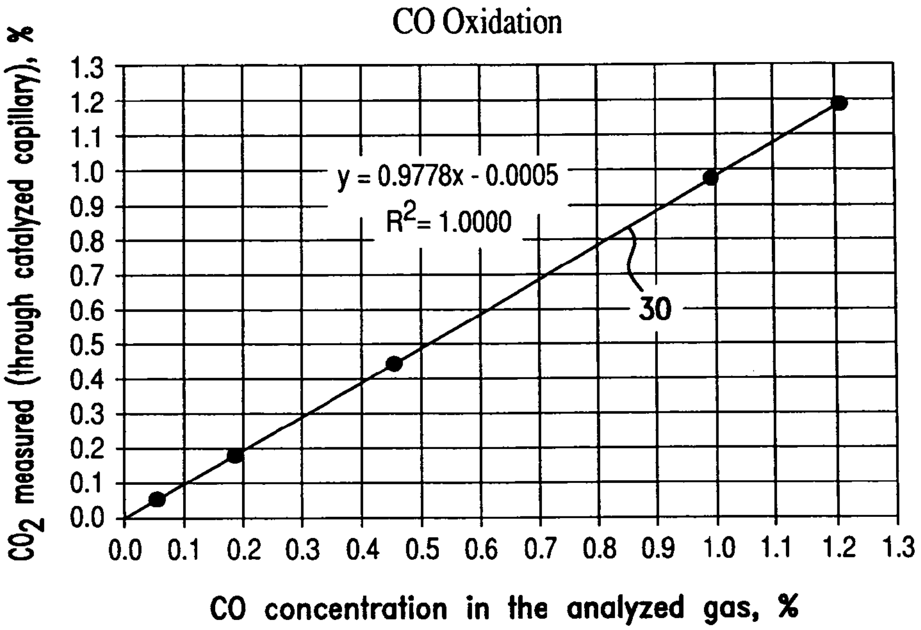
FIG. 3 shows a graph illustrating the concentration of $CO_2$ measured relative to the concentration of CO in the analyzed gas, thus illustrating the oxidation of CO to $CO_2$.

FIG. 3 shows a graph illustrating the oxidation of CO to $CO_2$ as measured using a mass spectrometry system 10 in accordance with the present invention. The catalyst was palladium and the catalyzed region 15 of the inlet capillary 14 was heated to 280° C.. The synthetic gas mixture also contained 10% $O_2$ as an inert gas. As noted, concentration of CO in the exhaust gas can not be readily measured by the conventional mass spectrometry systems while also measuring $N_2$ because the molecular weight of CO is very close to $N_2$ (28.0104 a.m.u. and 28.0134 a.m.u., respectively). While passing through the catalyzed capillary 15 of the present invention into the mass spectrometer 12, CO was oxidized and the amount of $CO_2$ produced was measured. As clearly shown by the plotted line 30 in FIG. 3, the amount of produced $CO_2$ quantitatively matched the amount of introduced CO, the concentration of CO in the synthetic gas mixture increasing from 0.125% to 1.25%. The slope of the plotted line 30 is very close to unity at 0.9778, having an intercept close to zero, and very high $R^2$ value. The slope of near unity implies that across all concentrations, the conversion of CO to $CO_2$ was close to 98%. Thus, CO is significantly oxidized and converted to $CO_2$ so that information regarding CO in the analyzed gas can be derived. In this manner, the mass spectrometry system 10 of the present invention can be used to readily determine information regarding CO, even in the presence of nitrogen.

Of course, the mass spectrometry system 10 may be used to analyze other compositions as well. For example, the mass spectrometry system 10 may be used in the analysis of hydrocarbons. More specifically, in the electron-impact-ionization mass spectrometers, hydrocarbon ionization produces a broad range of fragments, which makes their quantification very difficult. Thus, in accordance with the present invention, hydrocarbons can be oxidized in the catalyzed region 15 of the inlet capillary 14 in a manner similar to that described above, to yield $CO_2$.

Figure 4:
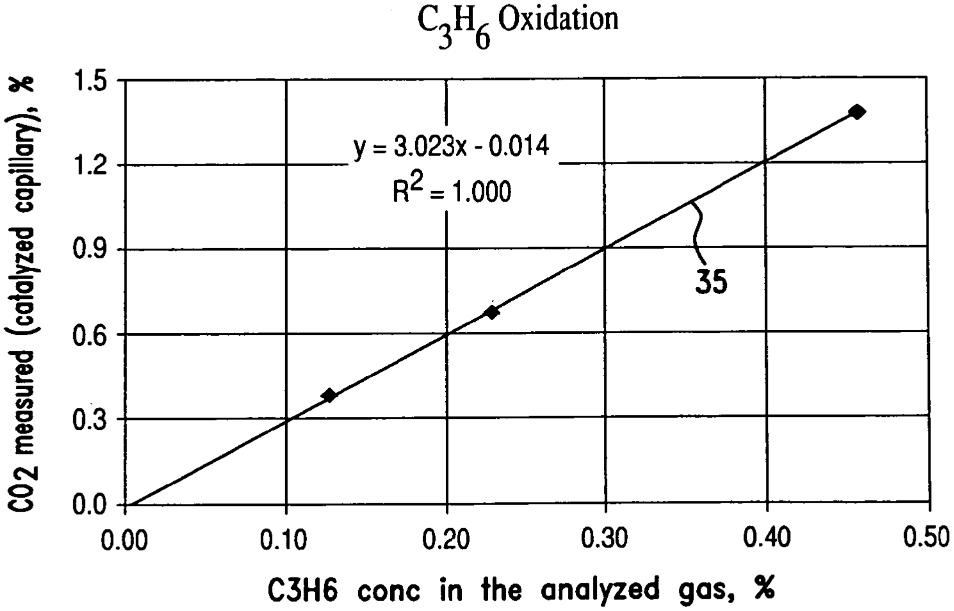
FIG. 4 shows a graph illustrating the concentration of $CO_2$ measured relative to the concentration of $C_3H_6$ in the analyzed gas, thereby illustrating the oxidation of $C_3H_6$ to $CO_2$.

FIG. 4 shows oxidation of $C_3H_6$ in the catalyzed region 15 of the inlet capillary 14. The catalytic coating 20 is palladium and the catalyzed region 15 of the inlet capillary 14 was heated to 280° C.. The synthetic gas mixture also contained 10% $O_2$ as the inert gas. As shown, the slope of the plotted line 35 of FIG. 4 is close to the expected value of three, since oxidation of one molecule of $C_3H_6$ produces three molecules of $CO_2$.

Figure 5:
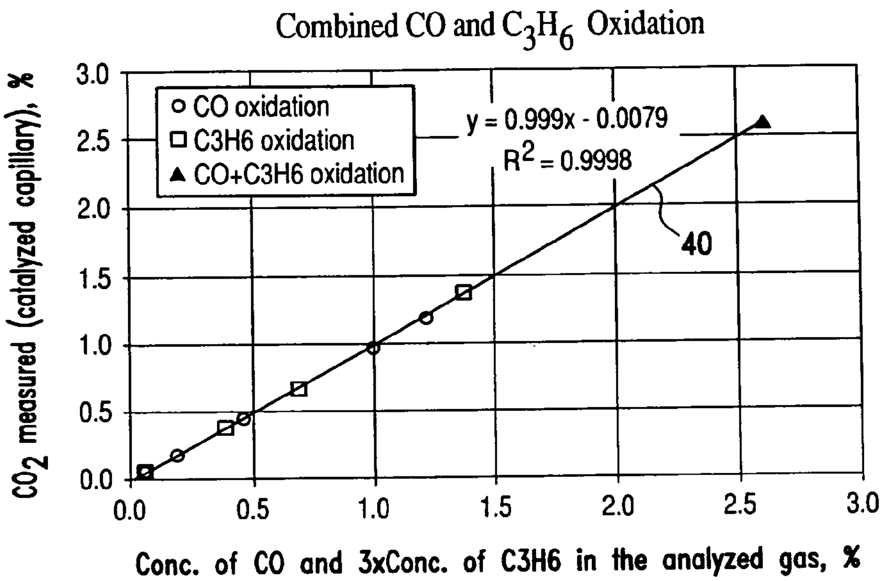
FIG. 5 shows a graph illustrating the concentration of $CO_2$ measured relative to the concentration of CO and three times the concentration of $C_3H_6$ in the analyzed gas, thereby illustrating the combined oxidation of CO and $C_3H_6$ to $CO_2$.

The mass spectrometry system 10 of the present invention may also be utilized to analyze and measure the total amount of carbonaceous reductants in the gas stream, including hydrocarbons and CO. FIG. 5 shows the combined oxidation of CO and $C_3H_6$ in the catalyzed region 15 of the inlet capillary 14. The catalyst was palladium and the catalyzed region 15 of the inlet capillary 14 was heated to 280° C., the synthetic gas mixture also having 10% $O_2$ as inert gas. In particular, line 40 of FIG. 5 shows the relationship of the test data for individual analysis of CO (circles), $C_3H_6$ (squares), and the mixture of the two (triangle). As can be seen, the quantitative conversion was maintained for all cases.

As previously mentioned, the above described analysis utilizing the mass spectrometry system 10 of the present invention can be performed even when there is $CO_2$ present in the original analyzed gas stream. In such an instance, the measurement for the gas component of interest is calculated by measuring the amount of $CO_2$ in the un-catalyzed sampled gas, and subtracting the results from the results obtained using the catalyzed capillary. For example, the mass spectrometry system 10 may be provided with a valve that allows diverting of a sample of the gas stream into an additional capillary that provides the un-catalyzed sample gas stream to the mass spectrometer 12 so that a base line $CO_2$ measurement can be made.

The present invention described above can be modified in any appropriate manner to allow analysis of various gases known to be difficult to measure. For example, the hydrocarbon methane cannot be measured directly using conventional spectrometer systems because methane has a molecular mass of 17 a.m.u. which interferes with major fragments of $H_2O$ ionization. In addition, methane is very resistant to oxidation, and may not be readily analyzed using the above described mass spectrometry system 10 unless modification is made to the described embodiment. Modifications to the described embodiment of the mass spectrometry system 10 may include increasing the temperature to which the catalyzed region 15 is heated, increasing the loading of the catalyst, increasing the length of the catalyzed region 15, and/or providing multiple catalyzed regions.

In the above described manner, information regarding variety of different species of exhaust gas components can be determined such as quantity/amount. For instance, the above described mass spectrometry system 10 and method may be used to obtain information $NH_3$ having a mass of 17 a.m.u. which interferes with one of the fragments of $H_2O$. The $NH_3$ can be oxidized to NO which has a mass of 30 a.m.u. In another example, $H_2S$ having a mass of 34 a.m.u. which interferes with the $O^{16}O^{18}$ isotope of oxygen, can be oxidized to $SO_2$ so that desired information can be derived. The mass spectrometry system 10 can be utilized to attain nearly 100% conversion of $H_2S$ to $SO_2$ using a Pt-catalyzed inlet capillary which is heated to about 275° C. at the catalyzed region. At higher temperature, around 310° C., $SO_2$ gets further oxidized to $SO_3$.

Figure 6:
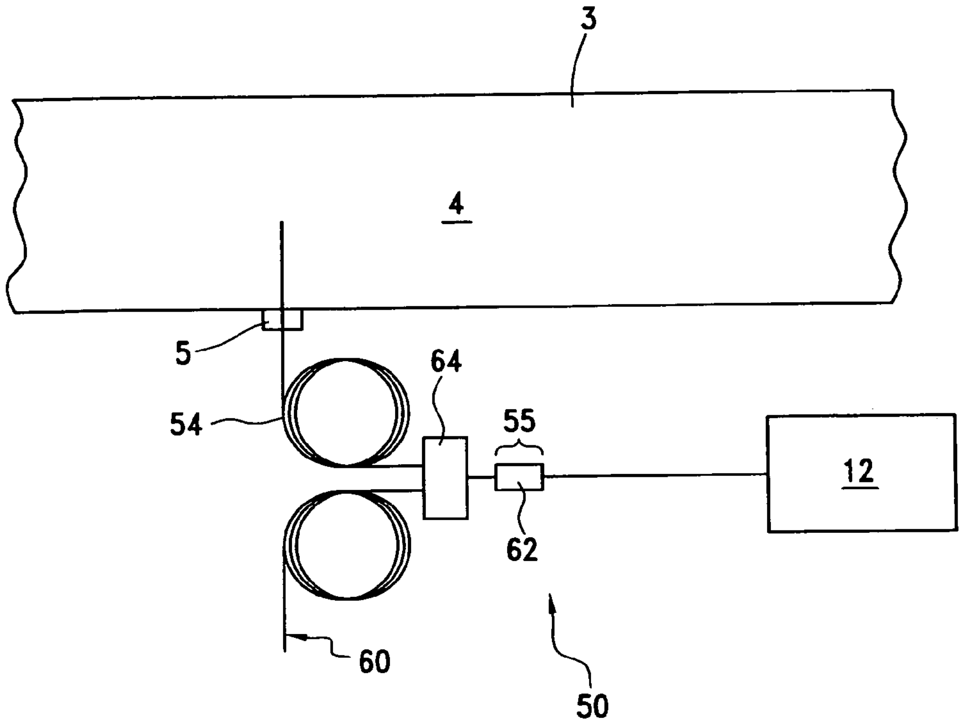
FIG. 6 is a schematic illustration of a mass spectrometry system in accordance with another embodiment of the present invention.

FIG. 6 shows a schematic illustration of a mass spectrometry system 50 in accordance with another example embodiment of the present invention that is substantially similar to that shown in FIG. 1. Thus, the mass spectrometry system 50 includes a mass spectrometer 52, and an inlet capillary 54 that connects the mass spectrometer 52 to an exhaust piping 3 via sampling port 5 to sample the exhaust gas stream 4. The inlet capillary 54 includes a catalyzed region 55 through which the sampled gas is passed, heater 62 being provided in the catalyzed region 55. In addition, the mass spectrometry system 50 of the illustrated embodiment includes a secondary capillary 60 and a mixing device 64, which in the present embodiment, is implemented as a nano-mixer positioned upstream of the catalyzed region 55. In this embodiment, the sampled gas to be analyzed is mixed with a secondary gas, for example (but not limited to) ambient air, using the mixing device 64. The gas stream delivered through the sampling capillary 54 is mixed with the secondary gas stream from the capillary 60 prior to contacting a catalyzed region 55 of the inlet capillary 54.

The described embodiment of FIG. 6 may be utilized when catalytic conversion for the analyzed component of the exhaust gas requires additional species that is absent (or present in insufficient amount) in the analyzed gas itself. For example, during regeneration of NOx adsorber catalysts, it is important to measure the total “reducing potential” of the net rich gas mixture, such mixtures often containing a mixture of hydrocarbons, CO, $H_2$, and possibly some small amounts of oxygen. However, the commercially available lambda sensors cannot accurately measure lambda under such net rich conditions because they have very different responses to $H_2$, CO, and various hydrocarbons. In such instances, the described embodiment of FIG. 6 may be utilized to measure the true lambda. In particular, the secondary capillary 60 is used to provide a constant flow of ambient air or other gas so that after mixing with the sampled gas from the inlet capillary 54, the stoichiometry of the mixed gas is net lean instead of net rich. Then, the true lambda can be measured by the mass spectrometry system 10 of the present invention as reduction in the oxygen concentration due to oxidation of various reductants molecules.

As described above, the catalytic coating 20 in the catalyzed portion 15 of the inlet capillary 14 can be provided using gas-phase methods such as chemical vapor deposition (CVD) or similar techniques. In other embodiments, the catalytic coating 20 may be provided using liquid-chemistry methods, such as deposition-precipitation, etc. Platinum (Pt) and palladium (Pd) catalytic coatings have been deposited in the inlet capillary 14 using the CVD technique, and have been found to be effective in facilitating analysis of exhaust gas stream from an internal combustion engine.

In providing the catalytic coating of Pt or Pd, the volatile organometallic compounds such as acetylacetonates of Pt or Pd, respectively, were used as precursors for CVD. Of course, other catalytic coatings may be utilized, depending on the application, including other noble metals (such as Rh, etc.) or base metal compounds such as Fe, Co, Ni, Cu, $CeO_2$, $TiO_2$, $Al_2O_3$, etc., or combinations thereof. If the catalytic coating is provided using CVD techniques, these catalysts can be introduced using either the volatile organometallic compounds, or other volatile compounds such as carbonyls, chlorides, etc. Moreover, the temperature and loading of the catalyst, as well as the number of catalyzed regions, may be varied in accordance with various implementations of the present invention depending on the desired results.

In view of the above, it should also be apparent to one of ordinary skill in the art that the present invention also provides a method of analyzing a gas by mass spectrometry. The method includes providing a mass spectrometer adapted to analyze a plurality of components of the gas, providing an inlet capillary with an inner bore that has a bore wall, coating at least a portion of the bore wall with a catalytic coating, conveying the gas to the mass spectrometer through the inner bore of the inlet capillary, and reacting at least one component of the gas with the catalytic coating to convert it to another gas species as the gas is conveyed. As evident from the discussions above, the method in accordance with one embodiment further includes analyzing the gas species to derive information associated with the converted component including, for example, detection or quantification of the converted component. The method may further include heating the catalytic coating as the gas is conveyed through the inlet capillary.

In accordance with another embodiment, coating of the bore wall with the catalytic coating may be attained using a chemical vapor deposition process which may include heating at least a segment of the inlet capillary. The chemical vapor deposition process may further include conveying a gaseous precursor through the inlet capillary, and decomposing the precursor.

Therefore, in view of the above, it should be evident to one of ordinary skill in the art that the present invention provides a mass spectrometry system having an inlet capillary with a catalytic coating thereon, that allows use of mass spectrometers and mass spectrometry techniques for detection and quantification of gas components which was previously not possible due to ions or fragments of gas components interfering with ions or fragments of other components, or due to similar fragmentation patterns of gas components such as for hydrocarbons that prevent accurate attribution.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A mass spectrometry system for analyzing components of a gas, said system comprising:

a mass spectrometer adapted to analyze components of the gas;

an elongate inlet capillary fluidically connected to said mass spectrometer to convey a sample of the gas into said mass spectrometer, said inlet capillary including an inner bore that defines a bore wall within said inlet capillary, said bore wall having a catalytic coating thereon that reacts with at least one component of the sampled gas to convert said at least one component to another gas species that is a different gas than said at least one component, but is directly correlated to said at least one component, as the sampled gas is conveyed within said inner bore of said inlet capillary having said catalytic coating; and a heater positioned on an outer wall of said inlet capillary which heats said catalytic coating to a temperature not more than approximately 310° C.;

wherein said mass spectrometer analyzes said another gas species to derive information associated with said at least one component of the gas, the analysis including analyzing the gas for presence of said another gas species to establish a baseline.

2. The system of claim 1, wherein the gas is exhaust gas from an internal combustion engine, and includes carbon monoxide and nitrogen gas components.

3. The system of claim 2, wherein said catalytic coating is adapted to convert said carbon monoxide component of the gas into carbon dioxide.

4. The system of claim 1, wherein said catalytic coating includes at least one of palladium and platinum.

5. The system of claim 1, wherein said heater is an electrical heater that circumscribes an outer wall of said inlet capillary.

6. The system of claim 1, wherein temperature of said heater is adjustable.

7. The system of claim 1, wherein said catalytic coating is applied to said bore wall by at least one of chemical vapor deposition and deposition-precipitation.

8. The system of claim 1, further comprising a secondary capillary fluidically connected to said inlet capillary for providing a secondary gas to the sampled gas.

9. The system of claim 8, further comprising a mixing device positioned upstream of said catalytic coating that mixes the secondary gas provided through said secondary capillary with the sampled gas in said inlet capillary.

10. A mass spectrometry system for analyzing carbon monoxide component of an exhaust gas from an internal combustion engine, said system comprising:

a mass spectrometer adapted to analyze a plurality of components of the exhaust gas;

an elongate inlet capillary connected to said mass spectrometer to convey a sample of the exhaust gas into said mass spectrometer, said inlet capillary including an inner bore that defines a bore wall within said inlet capillary, said bore wall having a catalytic coating of at least one of palladium and platinum thereon that converts said carbon monoxide component of the exhaust gas into carbon dioxide which is directly correlated to said carbon monoxide component as the sampled exhaust gas is conveyed within said inner bore of said inlet capillary having said catalytic coating; and a heater positioned on an outer wall of said inlet capillary to heat said catalytic coating to a temperature not more than approximately 310° C.;

wherein said mass spectrometer analyzes said carbon dioxide converted from said carbon monoxide component, to derive information associated with said carbon monoxide component of the sampled exhaust gas, the analysis including analyzing the exhaust gas for presence of carbon dioxide to establish a baseline.

11. A method of analyzing a gas by mass spectrometry comprising:

providing a mass spectrometer adapted to analyze a plurality of components of the gas;

providing an elongate inlet capillary with an inner bore defining a bore wall within said inlet capillary;

coating at least a portion of said bore wall with a catalytic coating;

conveying a sample of the gas into said mass spectrometer through said inner bore of said inlet capillary;

heating said catalytic coating to a temperature not more than approximately 310° C. as the sampled gas is conveyed within said inner bore of said inlet capillary;

reacting at least one component of the sampled gas with said catalytic coating within said inlet capillary to convert said at least one component to another gas species that is a different gas than said at least one component, but is directly correlated to said at least one component, as the sampled gas is conveyed within said inner bore of said inlet capillary;

analyzing the component of the sampled gas that has been converted to said another gas species;

analyzing said gas for presence of said another gas species to establish a baseline; and deriving information associated with said at least one component of the gas based on the analysis.

12. The method of claim 11, wherein coating of said bore wall with said catalytic coating is attained by at least one of a chemical vapor deposition process and a deposition-precipitation process.

13. The method of claim 12, wherein said coating of said bore wall is attained by chemical vapor deposition process that includes heating at least a segment of said inlet capillary.

14. The method of claim 12, wherein said chemical vapor deposition process includes conveying a gaseous precursor within said inner bore of said inlet capillary, and decomposing said precursor.

15. The method of claim 11, further including adjusting the temperature of said catalytic coating.

16. The method of claim 11, wherein the gas is exhaust gas from an internal combustion engine, and includes carbon monoxide and nitrogen gas components.

17. The method of claim 16, wherein said catalytic coating converts said carbon monoxide component into carbon dioxide.

18. The method of claim 11, wherein said catalytic coating includes at least one of palladium and platinum.

19. A method of analyzing exhaust gas from an internal combustion engine having at least carbon monoxide and nitrogen gas components by mass spectrometry, said method comprising:

providing an elongate inlet capillary with an inner bore defining a bore wall within said inlet capillary;

depositing a catalytic coating of at least one of palladium and platinum on at least a portion of said bore wall by chemical vapor deposition process;

conveying a sample of said gas within said inner bore of said inlet capillary having said catalytic coating;

heating said catalytic coating to a temperature not more than approximately 310° C. as the sampled gas is conveyed within said inner bore of said inlet capillary;

reacting said carbon monoxide component of the sampled gas with said catalytic coating within said inlet capillary to convert said carbon monoxide to carbon dioxide which is directly correlated to said carbon monoxide as the sampled gas is conveyed within said inner bore of said inlet capillary;

analyzing said carbon dioxide that is converted from said carbon monoxide by mass spectrometry;

analyzing said exhaust gas for presence of carbon dioxide to establish a baseline; and deriving information associated with said carbon monoxide based on analysis of said carbon dioxide that is converted from said carbon monoxide and carbon dioxide in said exhaust gas.

* * * * *